United States Patent [19]

Windish

[11] Patent Number: 4,531,428

[45] Date of Patent: Jul. 30, 1985

[54] PLANETARY TRANSMISSION

[75] Inventor: Willis E. Windish, Pekin, Ill.

[73] Assignee: Caterpillar Tractor Co., Peoria, Ill.

[21] Appl. No.: 456,937

[22] Filed: Jan. 10, 1983

[51] Int. Cl.³ .............................................. F16H 57/10
[52] U.S. Cl. ........................................ 74/765; 74/763;
74/761; 74/758; 74/768
[58] Field of Search ................. 74/758, 759, 753, 760,
74/761, 762, 763, 764, 765, 768, 769

[56] References Cited

U.S. PATENT DOCUMENTS

| | | | |
|---|---|---|---|
| 3,010,343 | 11/1961 | Orr et al. | 74/753 |
| 3,031,901 | 5/1962 | Simpson | 74/765 X |
| 3,452,621 | 7/1969 | Golan et al. | 74/753 |
| 3,946,624 | 3/1976 | Murakami et al. | 74/753 X |
| 3,979,974 | 9/1976 | Murakami | 74/759 |
| 4,004,473 | 1/1977 | Pearce et al. | 74/759 |
| 4,027,551 | 6/1977 | Murakami et al. | 74/759 |
| 4,038,887 | 8/1977 | Murakami et al. | 74/769 |
| 4,038,888 | 8/1977 | Murakami et al. | 74/765 |
| 4,086,827 | 5/1978 | Chana | 74/759 |
| 4,178,813 | 12/1979 | Smemo | 74/758 X |
| 4,205,563 | 6/1980 | Gorrell | 74/730 |
| 4,446,758 | 5/1984 | Winzeler et al. | 74/758 |

Primary Examiner—George H. Krizmanich
Assistant Examiner—Dirk Wright
Attorney, Agent, or Firm—Charles E. Lanchantin, Jr.

[57] ABSTRACT

A planetary transmission (10) is disclosed for a vehicle or the like which has input and output members (100,16), and first and second planetary gear sets (26,28). The second planetary gear set (28) has a second sun gear (154) connected to the input member (100), a second ring gear (156) connected to a first sun gear (138) of the first planetary gear set (26), and a second planet carrier (160) connected to the output member (16). A coupling device (162) is used for connecting the first and second planet carriers (144,160) for joint rotation which is at least in part disposed radially outwardly of the second planetary gear set (28). Brake assemblies (38,46) are provided for selectively holding the second and first ring gears (156,142) stationary and providing forward and reverse modes of operation respectively.

20 Claims, 4 Drawing Figures

| GEAR | CLUTCHES & BRAKES ENGAGED | | | | | | | | TOTAL REDUCTION | STEP RATIO |
|---|---|---|---|---|---|---|---|---|---|---|
| | 32 | 34 | 36 | 38 | 40 | 42 | 44 | 46 | | |
| 1 | ● | | | ● | | | | | 4.57 | |
| 2 | | ● | | ● | | | | | 3.13 | 1.46 |
| 3 | ● | | | | ● | | | | 2.53 | 1.24 |
| 4 | ● | | | | | ● | | | 2.24 | 1.13 |
| 5 | ● | | | | | | ● | | 1.97 | 1.14 |
| 6 | | ● | | | ● | | | | 1.74 | 1.13 |
| 7 | | ● | | | | ● | | | 1.53 | 1.13 |
| 8 | | ● | | | | | ● | | 1.35 | 1.14 |
| 9 | ● | | ● | | | | | | 1.00 | 1.35 |
| 10 | | ● | ● | | | | | | 0.69 | 1.46 |
| NEUT. | | | ● | | | | | | | |
| R-1 | ● | | | | | | | ● | -5.29 | |
| R-2 | | ● | | | | | | ● | -3.62 | 1.46 |

४,५३१,४२८

PLANETARY TRANSMISSION

DESCRIPTION

Technical Field

This invention relates generally to a planetary transmission, and more particularly to a reversible planetary gear transmission of the power shift type for a vehicle.

BACKGROUND ART

Power shift transmissions are known in the earthmoving and trucking vehicle industries which offer a large number of gear ratios by utilizing a plurality of serially interconnected planetary gear sets and a plurality of clutches and brakes for effecting the individual gear steps. U.S. Pat. No. 4,205,563 issued to J. M. Gorrell on June 3, 1980 is generally representative of such planetary transmissions. In that embodiment a range planetary gear unit and a reversing planetary gear unit are coupled together at the output end of the transmission and are serially connected to a speed planetary gear unit at the front or input end to provide seven forward and one reverse speed ratios. The output shaft is connected to the planet carrier of the range planetary gear unit through a centershaft which must carry relatively high torque so that the centershaft must be of substantial diameter and connected by strong joints to the associated elements. Since the centershaft extends forwardly within the rear reversing planetary gear unit, the reversing planetary gear unit is enlarged and the annular disc pack reversing brake is enlarged at additional expense.

Understandably, a considerable number of alternative planetary transmissions have been employed or suggested which embody different element connections and/or placement of the reversing planetary gear unit and the multiple speed planetary gear units. Exemplifying the art in this area are: U.S. Pat. No. 4,004,473 issued to R. O. Chambers, et al on Jan. 25, 1977; U.S. Pat. No. 4,038,887 issued to N. Murakami et al on Aug. 2, 1977; and U.S. Pat. No. 4,086,827 issued to H. E. Chana on May 2, 1978. However, these alternative transmissions are either relatively uneconomical in construction such as by requiring excessively large components, overrunning clutches, or compound planetary sets, or have other deficiencies such as having relatively high relative speeds between the elements so that the service life of the transmission is adversely affected.

U.S. Pat. No. 4,027,551 issued to N. Murakami et al on June 7, 1977 is still another example of such multispeed planetary transmissions. Undesirably, that transmission utilizes a plurality of concentric tubular connecting elements or shafts that forces the increased diameter of the encircling elements and adds to the complexity of the bearing supports.

Still another problem with prior transmissions is that they do not provide the desired step ratios. Specifically, it is often desirable to have a plurality of relatively close steps or smaller step ratios in the intermediate speed range where the vehicle is more frequently working, and this requirement must be balanced against the need for a wide overall speed range.

The present invention is directed to overcoming one or more of the problems as set forth above.

DISCLOSURE OF THE INVENTION

In one aspect of the invention a planetary transmission includes input and output members, a first planetary gear set having a first sun gear, a first ring gear and a first planet carrier, and a second planetary gear set located between the first planetary and the output member and having a second sun gear, a second ring gear and a second planet carrier. The second sun gear is connected to the input member, the second ring gear is connected to the first sun gear, and the second planet carrier is connected to the output member for joint rotation. Advantageously, a coupling device at least partly disposed radially outwardly of the second planetary gear set connects the first and second planet carriers.

A first brake assembly is utilized in conjunction with the second planetary gear set of the instant planetary transmission for holding the second ring gear stationary and providing a forward mode of operation, and a second brake assembly is utilized in conjunction with the first planetary gear set for holding the first ring gear stationary and providing a reverse mode of operation of the output member.

A generally cylindrical hollow member connects the first and second planet carriers, and the rear planetary gear set is compactly nested radially within the hollow member.

The above-mentioned two planetary gear sets are preferably selectively connected to third, fourth and fifth planetary gear sets in such a manner as to jointly drive the second ring gear at the desired speed. Furthermore, a front splitter planetary gear unit in series with the input member is effective in one embodiment to establish ten forward and two reverse speeds which is particularly adaptable to a wheel tractor for agricultural tillage purposes.

BEST MODE FOR CARRYING OUT THE INVENTION

Figures 1, 2:
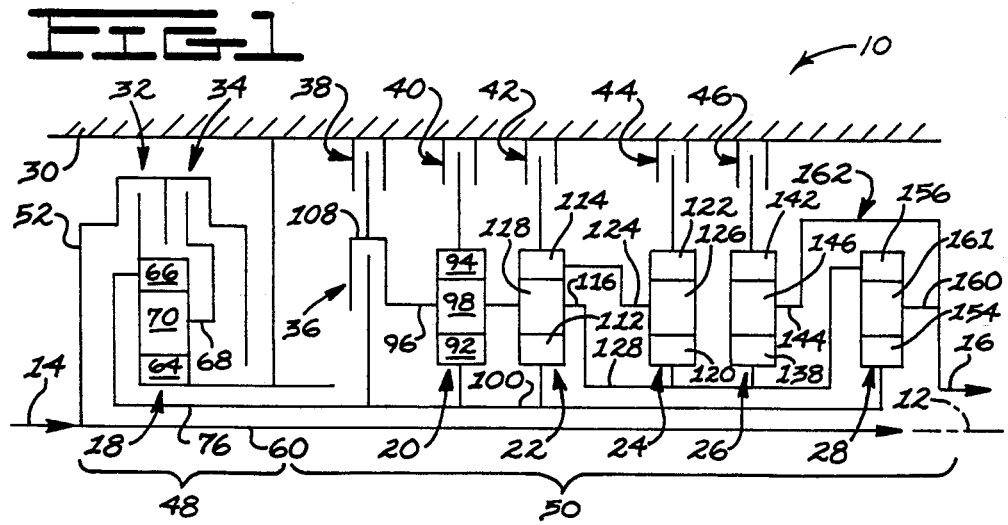
FIG. 1 is a diagrammatic, side elevational view of one embodiment of the planetary transmission of the present invention and showing the planetary elements on only one side of the rotational axis for simplicity.
FIG. 2 is a chart showing the various clutches and brakes which must be engaged to obtain the ten forward and one reverse speeds of the transmission illustrated in FIG. 1, along with the total speed ratio reduction for each speed and the step ratios between each speed.

Referring to FIG. 1, a reversible planetary transmission 10 is schematically illustrated on one side of a rotational axis 12. An engine driven input member 14 is located at the left hand side when viewing the drawing or at the forward end, while an output member 16 is located at the right hand side when viewing the drawing or at the rearward end. Although not shown, the output member is connected to a conventional mechanism for powerably rotating the ground-engaging members of the vehicle.

In the embodiment illustrated six interconnected planetary gear sets or epicyclic gear trains 18, 20, 22, 24, 26 and 28 are rotatably supported concentrically along the axis 12 within a surrounding and generally tubular transmission housing assembly 30. Three clutch means or disc type clutch assemblies 32, 34 and 36 and five brake means or disc type brake assemblies 38, 40, 42, 44 and 46 are serially arranged along the length of the transmission for cooperating with and selectively coupling certain elements of the planetary gear sets and providing ten forward speeds and two reverse speeds as is indicated by the speed chart of FIG. 2.

The planetary transmission 10 has a front section or splitter planetary gear unit 48 and a rear section 50. The front section 48 includes the first planetary gear set 18 and the first and second clutch means 32,34, and basically serves to provide either a direct drive mode or an overdrive mode of operation. As shown best in FIG. 3, the front section 48 includes a rotating housing 52 which is supported by first and second bearing assemblies 54,56 within the walls of the housing assembly 30. The rotating housing is releasably coupled to the input member 14 by a spline connection 58, and a power take-off (PTO) shaft 60 is also releasably connected to the input member by a spline connection 62 so that these components are jointly driven at engine speed. The first planetary gear set 18 has first sun gear, ring gear and planet carrier elements 64, 66 and 68 of the usual type wherein a plurality of similar planet gear elements 70 are rotatably mounted on the carrier element and are in intermeshing engagement with the teeth on the ring and sun gear elements.

The first sun gear element 64 is continually held stationary as a reaction member by a spline connection 72 to the housing assembly 30. A third bearing assembly 74 rotatably supports the first ring gear element 66 within the rotating housing 52, and a tubular shaft 76 is releasably connected to the first ring gear element by a spline connection 78. The tubular shaft serves as the output of the front section 48, but the input for the rear section 50. A thrust bearing assembly 80 is seated within the planet carrier element 68 and adapted to contact the front end of the stationary sun gear element 64 for limiting the rearward axial movement thereof.

First clutch means 32, when engaged, couples the rotating housing 52 directly to the first ring gear element 66 and the tubular shaft 76 to establish a direct drive. Second clutch means 34, when engaged, couples the rotating housing to the first planet carrier element 68 through an intermediate hub element 82 to establish an overdrive ratio. Each of these clutch means includes a hydraulically engaged annular actuating piston 84 which is retracted by a plurality of compression springs 86. Pressurized fluid is controllably delivered to the respective actuating chamber 88 defined between the rotating housing and piston on one side thereof, and counterbalancing fluid under basically only centrifugal pressure is supplied to a balancing chamber 90 on the opposite side thereof. Because the centrifugal pressure head on both sides of the actuating piston is thereby substantially equalized these clutch means can be engaged more like a stationary clutch and more rapidly disengaged upon release of pressure to the respective actuating chamber 88.

Figure 4:
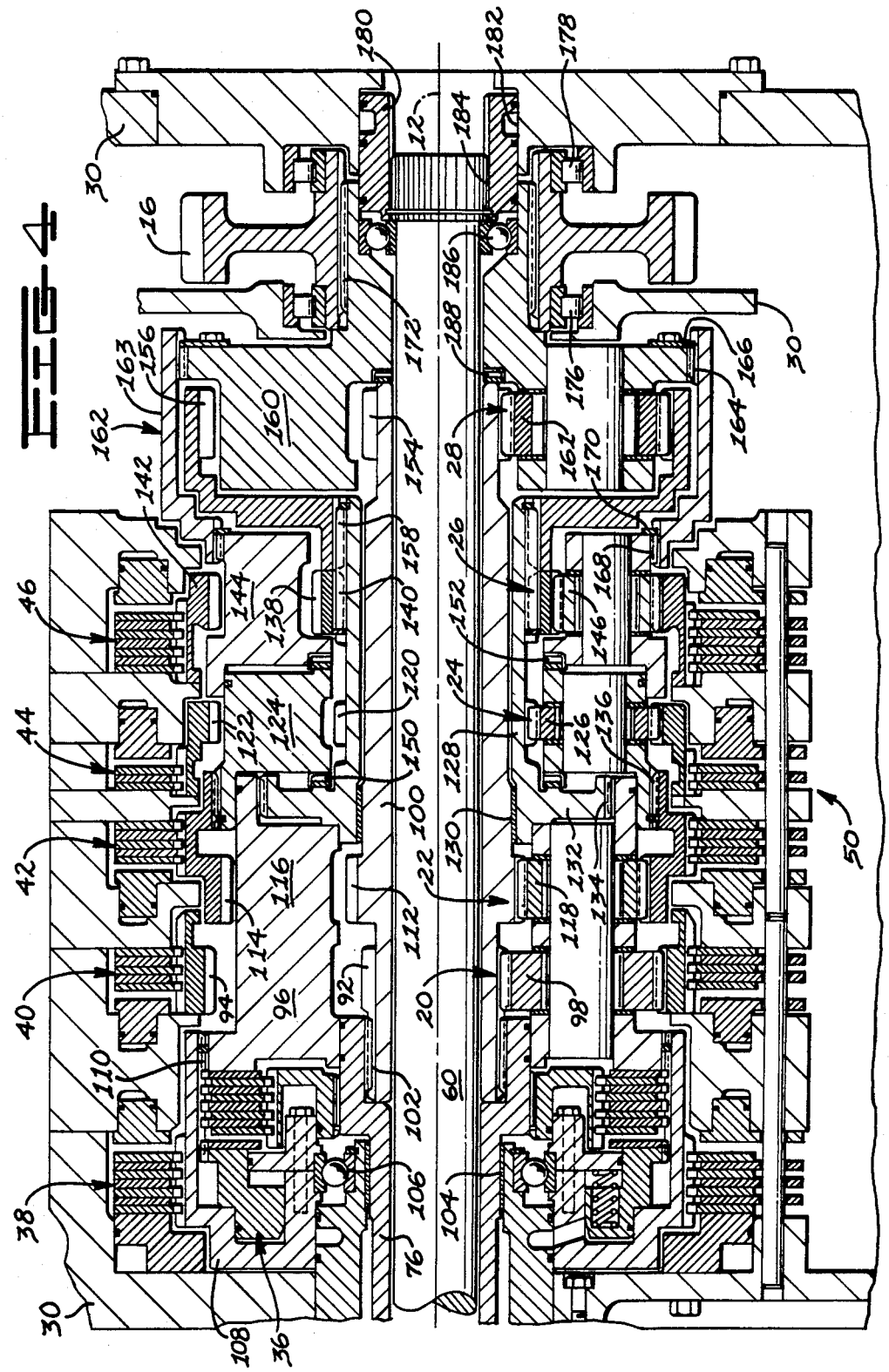
FIG. 4 is a diagrammatic, side elevational sectionalized view of the remaining rear portion of the transmission shown in FIG. 1 which is serially connected to the front splitter planetary gear unit of FIG. 3.

The third clutch means 36 illustrated in FIG. 4 is of similar construction to the clutch means 32,34 described above, and the five brake means 38, 40, 42, 44 and 46 are preferably hydraulically engaged and spring disengaged also. While the clutch means and brake means are not hereinafter fully described in detail, it is to be understood that they are of the annular disc assembly type having a plurality of interleaved discs and plates which are axially slideable toward engagement by the respective actuating piston as is well known to those skilled in the power shift transmission art.

Referring next to FIGS. 1 and 4 and the construction of the rear section 50, the second planetary gear set 20 can be noted to include second sun gear, ring gear and planet carrier elements 92, 94 and 96 and a plurality of planet gear elements 98. In this example the second sun gear element 92 is an integral part of an elongate, intermediate tubular shaft 100 which is coupled at its forward end to the input tubular shaft 76 by a spline connection 102. Thus, shaft 100 may be referred to as the input member of the rear section. A sleeve bearing 104 rotatably supports the rear part of tubular shaft 76 and indirectly the forward part of tubular shaft 100 for joint rotation.

A fourth bearing assembly 106 rotatably supports a second rotating housing 108 associated with brake means 38 and clutch means 36 on the housing assembly 30. The second rotating housing 108 is coupled to rotate with the second planet carrier element 96 by a spline and retaining ring connection 110, and both can be held stationary for low speed operation of the planetary transmission 10 by engagement of the first brake means 38. Note that the clutch means 36 is compactly nested radially within the brake means 38.

With the engagement of the third clutch means 36 the second rotating housing 108, the input shaft 76 and the second planet carrier 96 are coupled together as a unit for a direct drive mode of operation in the rear section 50.

Engagement of the second brake means 40 enables the second ring gear element 94 to be held stationary for an intermediate speed condition.

The third planetary gear set 22 includes a third sun gear 112 integrally formed on the tubular shaft 100, a third ring gear element 114 adapted to be selectively held stationary by third brake means 42, and a third planet carrier element 116 integrally formed with the second planet carrier 96 as can be noted by reference to FIG. 4. A plurality of planet gear elements 118 mounted on the carrier element are intermeshingly engaged with the third sun and ring gear elements.

The fourth planetary gear set 24 has a fourth sun gear element 120, a fourth ring gear element 122, a fourth planet carrier element 124 and a plurality of planet gear elements 126. The fourth sun gear element 120 is integrally formed on a tubular shaft 128 which encircles the tubular shaft 100 and is at least partly supported thereon by a sleeve bearing 130. A flange or hub 132 is formed on the forward portion of tubular shaft 128 and a spline connection 134 thereon connects the planet carriers 96,116 thereto for joint rotation. Also, the third ring gear element 114 and the fourth planet carrier element 124 are releasably connected together for joint rotation by a spline and retaining ring connection 136.

The fifth planetary gear set 26 includes a fifth sun gear element 138 which is releasably connected to the tubular shaft 128 by a spline and retaining ring connection 140, and a fifth ring gear element 142 which can be held stationary to the housing assembly 30 by the engagement of fifth brake means 46 in order to establish a reverse mode of operation. A fifth planet carrier element 144 has rotatably mounted thereon fifth planet gear elements 146 which are intermeshed with the sun and ring gear elements.

As shown in FIG. 4 the flange 132 of tubular shaft 128 is in axial abutment with the integral planet carriers 96,116 which is locked against axial movement to the second rotating housing 108 at spline and retaining ring connection 110. A thrust bearing assembly 150 is disposed between the flange of the tubular shaft and the fourth planet carrier element 124, and another thrust bearing assembly 152 is disposed between the fourth planet carrier element and the fifth planet carrier element 144.

Lastly, the sixth or rear planetary gear set 28 has a sixth sun gear element 154 integrally formed on the distal end of the intermediate tubular shaft 100, and a sixth ring gear element 156 which is releasably secured to tubular shaft 128 by a spline and retaining ring connection 158. The rear planetary gear set also has a sixth planet carrier element 160 rotatably supporting a plurality of sixth planet gear elements 161 thereon which are intermeshingly engaged with the sixth sun and ring gear elements. Advantageously, a coupling device 162 is provided for releasably connecting the fifth and sixth planet carrier elements 144,160 for joint rotation. The coupling device includes a generally cylindrical hollow member or tubular member 163 extending axially radially outwardly of the rear planetary gear set. The rear portion of the hollow member is releasably secured to the sixth planet carrier element by a spline connection 164 of larger diameter than the rear planetary gear set and by a retaining element 166. Another spline connection 168 and retaining element 170 are located at the front portion of the hollow member to releasably secure it to the fifth planet carrier element 144. The rear portion of the sixth planet carrier element 160 has a spline connection 172 thereon which is releasably connected to the output member or output gear 16.

The output gear is rotatably supported at either side thereof by roller bearing assemblies 176,178 appropriately inserted within housing assembly 30. A sleeve 180 is rotatable within a stepped bore 182 in the housing assembly, and the rear end of the power take-off shaft 60 is releasably connected to the sleeve by a spline connection 184. A ball bearing assembly 186 supports the rear end of the power take-off shaft within the sixth planet carrier element 160, and a thrust bearing assembly 188 is disposed between the rear end of the intermediate tubular shaft 100 and the sixth planet carrier element to limit the rearward axial movement of that shaft.

INDUSTRIAL APPLICABILITY

Figure 3:
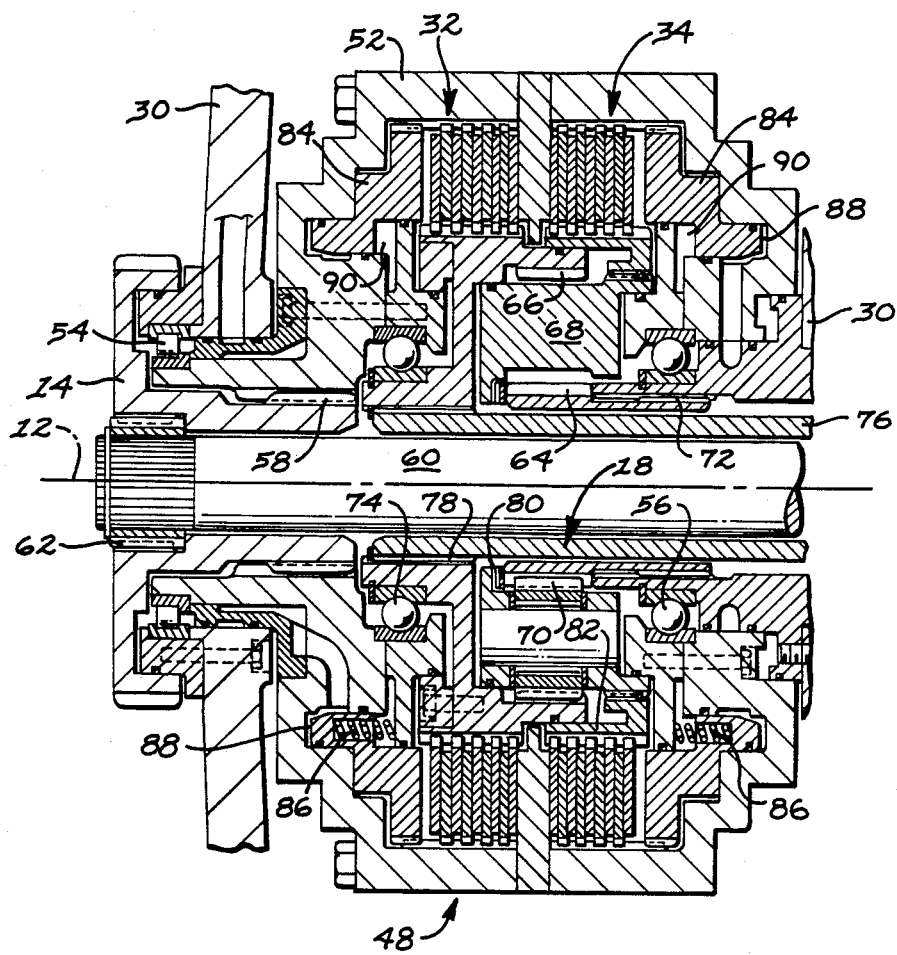
FIG. 3 is a diagrammatic, side elevational sectionalized view of the front splitter planetary gear unit of the transmission illustrated in FIG. 1.

The reversible planetary transmission 10 can be especially effective in an agricultural, wheeled vehicle. In first forward gear the first clutch means 32 is engaged in the front section 48 to provide a direct drive mode of operation since the input driven rotating housing 52 shown in FIG. 3 is thereby jointly rotatable with first ring gear element 66 and tubular shaft 76. Simultaneously, the first brake means 38 is engaged in the rear section 50 in order to hold the second rotating housing 108 and second planet carrier element 96 stationary. In turn, this holds the tubular shaft 128 and the sixth ring gear element 156 stationary enabling the sixth planetary gear set 28 to provide the desired speed reduction of about 4.57 as is reflected by the chart of FIG. 2.

A shift to second gear from first gear is accomplished by disengaging first clutch means 32 and engaging second clutch means 34 to provide an overdrive speed change in the front section 48. In that instance the input rotating housing 52 is connected for joint rotation with the first planet carrier 68, and since the sun gear element 64 is continuously held stationary the output ring element 66 and tubular shaft 76 is caused to rotate at a speed increase. The rear section 50 of the transmission, however, operates the same as in first gear with the result that a total speed reduction of about 3.13 is achieved.

A shift from second to third gear is effected by returning to the direct drive mode in the front section 48, by disengaging the first brake means 38, and by engaging the second brake means 40. The intermediate tubular shaft 100 drives both the second sun gear element 92 and the sixth sun gear element 154, the second ring gear element 94 is held stationary as a reaction, and a split power path results between the second and sixth planetary gear sets 20,28 in the rear section 50. About 45% of the torque is delivered by sun gear element 92 and about 55% of the torque is delivered by sun gear element 54. This provides a total speed reduction of about 2.53.

Continuing with an upshift to fourth gear, the direct drive condition of front section 48 is not affected, and only the third brake means 42 is engaged in the rear section. This activates the third planetary gear set 22 and effects a split power path similar functionally to the third gear speed with the sixth or last planetary gear set 28 and an overall speed reduction of about 2.24.

In fifth gear the front section 48 remains in direct drive as previously described, and the fourth brake means 44 is engaged in the rear section 50 as is indicated by the chart of FIG. 2. This activates the fourth planetary gear set 24, and since the intermediate tubular shaft 100 provides the input to the rear section by way of the third and sixth sun gear elements 112,154 a regenerative power path results involving the third planetary gear set 22. About 57% of the torque is delivered by sun gear element 112 and about 43% of the torque is delivered by sun gear element 154 in the split path to the sixth planetary gear set 28 for an overall speed reduction of about 1.97.

Sixth gear is achieved by reengaging the overdrive or second clutch means 34 in the front section 48 and reengaging the second brake means 40 as discussed previously. This combination provides a total speed reduction of about 1.74.

The overdrive clutch means 34 stays engaged for seventh gear, and the third brake means 42 is engaged in the rear section 50 of the transmission 10 to provide a total speed reduction of about 1.53.

In eighth gear the overdrive clutch means 34 remains engaged and the fourth brake means 44 is engaged to give a total speed reduction of about 1.35. Note that the speed increase in the third, fourth and fifth gear speeds is achieved by merely sequentially engaging the second, third and fourth brake means 40,42,44 with the direct drive or fifth clutch means 32 engaged. Similarly, the speed increase in the sixth, seventh and eighth gear speeds involves the sequential engagement of the same brake means only with the overdrive or second clutch means 34 engaged. Hence, the majority of the gear shifts in the intermediate ranges can be advantageously achieved by disengaging only one brake means and reengaging only one brake means.

By engaging both the first and third clutch means 32,36 a direct drive condition is achieved in both sections 48,50 to give the ninth gear.

Upshifting the front section 48 by solely engaging the overdrive clutch means 34, with the rear section 50 held in direct drive, enables the tenth gear speed to be achieved with a total speed reduction of about 0.69.

Preferably, a neutral mode of operation is effected by solely engaging the third clutch means 36 in the rear section 50. No power is directed to the rear section when the input housing 52 is rotating, however, because the clutch means 32,34 of the front section 48 are not engaged. Nevertheless, the power take-off shaft 60 can be rotated for an indefinite period in order to power auxiliary equipment, not shown. The direct drive or high speed condition of the rear section gives the desired degree of speed control of the various elements of the transmission 10. For example, if the vehicle is towed in neutral the planetary elements would not be overspeeded. Moreover, such high speed condition also reduces any vehicle tendency to creep.

Reverse is provided by engaging the fifth brake means 46 of the rear section 50 and holding fifth ring gear element 142 stationary. For low speed reverse the direct drive clutch means 32 is engaged and for high speed reverse the overdrive clutch means 34 is engaged in the front section 48. This respectively provides a total negative speed reduction of 5.29 and 3.62. In reverse the fifth and sixth planetary gear sets 26,28 are interconnected and power flow is regenerative therebetween. The power path to the sixth sun gear element 154 is low so that the elements connected thereto can be relatively small, whereas the cylindrical hollow member 163 is of generously or large enough diameter and so located that it can easily handle relatively high torque therethrough.

When the reversible planetary transmission 10 is placed in an agricultural wheeled vehicle the vehicle ground speeds can be expected to vary from about 4.3 Km/h (2.7 mph) in first gear forward to about 28.8 Km/h (18.0 mph) in tenth gear forward. Looking now at the last column of the chart of FIG. 2, one will note that the five step ratios from third gear to eighth gear are tightly grouped. This is desirable to allow the operator to precisely match the selected gear to the tillage or plowing requirements most often utilized in the intermediate speed ranges. This leads to a highly efficient mode of operation. Furthermore, a wide overall speed ratio is provided by this instant transmission.

Thus, it can be appreciated that the reversible planetary transmission 10 features a plurality of planetary gear sets 18, 20, 22, 24, 26 and 28 which are serially interconnected along a common central axis 12 in a particularly desirable manner. Specifically, the placement and cooperation between the penultimate and last planetary gear sets 26,28 allows high torque to be transmitted therethrough in both the forward and reverse gear speeds within a diametrically compact structure. For example, while the torque through generally cylindrical hollow member 162 is relatively high in reverse, its diameter external of the last planetary gear set 28 is entirely adequate to transmit such loads. Moreover, the last planetary gear set 28 is compactly nested within the hollow member which jointly rotates with the output member 16, the last planet carrier element 160 and the penultimate planet carrier element 144. Also, the spline connections 164,168 are of generous diameter so that they can be relatively short and still easily carry the expected loads, and yet can more easily accept deflection. These spline connections are also sized for ease of assembly of the serially connected planetary elements. Another feature resides in the fact that the first brake means 38 for achieving the first and second gear speeds is located near the front of the rear section 50 where it is radially nested outwardly of the third clutch means 36 within the same general tubular diameter of the remaining brake means 40, 42, 44 and 46. This makes the rear section 50 axially compact as well.

It is to be understood that one or more of the planetary gear sets 18, 20, 22 and 24 can be omitted from the transmission 10 without departing from the features noted in the paragraph immediately above, although this would reduce the number of gear speeds. For example, the omission of the splitter front section 48 would reduce the number of obtained speeds by half and yet the features of the rear section 50 are retained. The further omission of the second planetary gear set 20 and associated second brake means 40 would thereby reduce the rear sections capability to establishing four forward and one reverse speeds. Additional planetary gear sets, not shown, could be included in the rear section to increase the number of gear speeds while retaining the advantages enumerated above.

Other aspects, objects and advantages will become apparent from a study of the specification, drawings and appended claims.

I claim:

1. A planetary transmission having an input member and an output member, comprising:
   a first planetary gear set having a first sun gear, a first ring gear, and a first planet carrier;
   a second planetary gear set having a second sun gear connected to the input member, a second ring gear connected to the first sun gear, and a second planet carrier connected to the output member for joint rotation;
   coupling means for connecting the first and second planet carriers for joint rotation, the coupling means being at least partly disposed radially outwardly of the second planetary gear set; and
   first means for selectively holding the second ring gear stationary and causing the output member to be driven in a forward mode of operation in response to rotation of the input member.

2. The planetary transmission of claim 1 wherein the first means includes a housing assembly and a disc type brake assembly of a construction sufficient for locking the second ring gear to the housing assembly.

3. The planetary transmission of claim 1 including second means for selectively holding the first ring gear stationary and causing the output member to be driven in a reverse mode of operation in response to rotation of the input member.

4. The planetary transmission of claim 3 including third means for connecting the second ring gear and the second sun gear together for joint rotation and thereby causing the input member and the output member to be coupled together for joint rotation.

5. The planetary transmission of claim 4 wherein the third means includes a disc type clutch assembly and the first means includes a disc type brake assembly located generally radially outwardly of the disc type clutch assembly.

6. A planetary transmission having an input member and an output member, comprising:
   a first planetary gear set having a first sun gear, a first ring gear, and a first planet carrier:
   a second planetary gear set having a second sun gear connected to the input member, a second ring gear connected to the first sun gear, and a second planet carrier connected to the output member for joint rotation;
   coupling means for connecting the first and second planet carriers for joint rotation, the coupling means being at least partly disposed radially outwardly of the second planetary gear set;
a housing assembly;
a first brake assembly of a construction sufficient for connecting the second ring gear and the housing assembly and causing the output member to be driven in a forward mode of operation in response to rotation of the input member; and
a second brake assembly of a construction sufficient for connecting the first ring gear and the housing assembly and causing the output member to be driven in a reverse mode of operating in response to rotation of the input member.

7. The planetary transmission of claim 6 including a clutch assembly of a construction sufficient for connecting the second ring gear and the second sun gear for joint rotation and thereby causing the input member and the output member to be coupled together for joint rotation.

8. The planetary transmission of claim 7 wherein the clutch assembly is located generally radially within the first brake assembly.

9. The planetary transmission of claim 6 including a third planetary gear set having a third sun gear connected to the input member, a third ring gear, and a third planet carrier connected to the first sun gear and the second ring gear for joint rotation, and including a third brake assembly of a construction sufficient for connecting the third ring gear to the housing assembly and causing the output member to be driven in a forward mode of operatiion faster than when the first brake assembly is alternatively actuated.

10. A planetary transmission having an input member and an output member, comprising:
a first planetary gear set having a first sun gear, a first ring gear, and a first planet carrier;
a secondary planetary gear set having a second sun gear connected to the input member, a second ring gear connected to the first sun gear, and a second planet carrier connected to the output member for joint rotation;
coupling means for connecting the first and second planet carriers for joint rotation, the coupling means being at least partly disposed radially outwardly of the second planetary gear set;
a third planetary gear set having a third sun gear, a third ring gear, and a third planet carrier; and
a fourth planetary gear set having a fourth sun gear, a fourth ring gear and a fourth planet carrier, the third ring gear being connected for joint rotation with the fourth planet carrier, the third planet carrier being connected for joint rotation with the fourth sun gear and the first sun gear, and the third sun gear being connected to the input member.

11. The planetary transmission of claim 10 including a fifth planetary gear set having a fifth sun gear connected to the input member, a fifth ring gear, and a fifth planet carrier connected for joint rotation with the third planet carrier.

12. The planetary transmission of claim 11 including brake means for selectively holding one of the first, second, third, fourth and fifth ring gears stationary.

13. The planetary transmission of claim 12 including front section means for doubling the number of speed steps in conjunction with the engagement of the brake means and holding one of the ring gears stationary.

14. A planetary transmission having an input member and an output member, comprising:
a first planetary gear set having a first sun gear, a first ring gear, and a first planet carrier;
a second planetary gear set having a second sun gear connected to the input member, a second ring gear connected to the first sun gear, and a second planet carrier connected to the output member and to the first planet carrier for joint rotation;
a third planetary gear set having a third sun gear connected to the input member, a third ring gear, and a third planet carrier connected for joint rotation to the first sun gear and the second ring gear;
brake means for selectively holding one of the first ring gear, the second ring gear, and the third ring gear stationary;
a fourth planetary gear set having a fourth sun gear connected to joint rotation with the third planet carrier, a fourth ring gear, and a fourth planet carrier connected to the third ring gear; and
means for selectively holding the fourth ring gear stationary.

15. The planetary trasmission of claim 14 including a fifth planetary gear set having a fifth sun gear connected to the input member, a fifth planet carrier connected for joint rotation with the third planet carrier, a fifth ring gear, and means for selectively holding the fifth ring gear stationary.

16. The planetary transmission of claim 14 including a generally cylindrical hollow member connecting the first and second planet carriers, the second planetary gear set being located generally within the generally cylindrical hollow member and immediately preceding the output member.

17. A planetary transmission including a central axis having a first end and a second end, an input member located at the first end and an output member located at the second end, comprising:
a first planetary gear set having a first sun gear, a first ring gear, and a first planet carrier;
a second planetary gear set located closer to the second end than the first planetary gear set and having a second sun gear continuously connected to the input member, a second ring gear connected to the first sun gear, and a second planet carrier connected to the output member for joint rotation;
coupling means for connecting the first and second planet carriers for joint rotation, the coupling means being at least partly disposed radially outwardly of the second planetary gear set:
first means for selectively holding the first ring gear stationary; and
second means for powerably driving the first sun gear in response to rotation of the input member and causing rotation of the output member in a reverse mode of operation.

18. The planetary transmission of claim 17 wherein the second means includes means for connecting the input member and the first sun gear for joint rotation.

19. The planetary transmission of claim 14 including clutch means for connecting the third planet carrier and the input member for joint rotation.

20. The planetary transmission of claim 19 including front section means for doubling the number of speed steps in conjunction with the engagement of the brake means and holding one of the ring gears stationary.

* * * * *